(12) United States Patent
Huang et al.

(10) Patent No.: US 8,419,190 B2
(45) Date of Patent: Apr. 16, 2013

(54) COMPUTING DEVICE WITH IMAGING FUNCTION AND AUTO-FOCUSING METHOD FOR PROJECTION THEREOF

(75) Inventors: Yung-Yu Huang, Hsinchu (TW); Hsi-Pin Li, Hsinchu (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 197 days.

(21) Appl. No.: 13/004,957

(22) Filed: Jan. 12, 2011

(65) Prior Publication Data

US 2012/0113330 A1 May 10, 2012

(30) Foreign Application Priority Data

Nov. 10, 2010 (CN) .......................... 2010 1 0537987

(51) Int. Cl.
*H04N 9/31* (2006.01)
*G03B 3/10* (2006.01)
(52) U.S. Cl.
USPC ............................. 353/76; 353/101; 348/744
(58) Field of Classification Search .................... 353/69, 353/76, 101; 348/744, 745, E3.048
See application file for complete search history.

(56) References Cited

U.S. PATENT DOCUMENTS

2009/0296050 A1* 12/2009 Ishida ........................... 353/101
2010/0002123 A1* 1/2010 Nozaki et al. ............... 348/333.1

* cited by examiner

*Primary Examiner* — Kevin Pyo
(74) *Attorney, Agent, or Firm* — Li & Cai Intellectual Property (USA) Office

(57) ABSTRACT

A auto-focusing method for projection of a computing device with imaging function is illustrated. The computing device exemplarily includes a projection unit, an image receiving unit, and a processing unit. The method firstly controls the projection unit to project images on plural positions along an optical axis. The method then controls the image receiving unit to receive the images, which are regarded as candidate images, projected on the positions by the projection unit. The candidate images correspond to the projective positions. The method further receives the candidate images captured by the image receiving unit, and compute their definitions. Therefore, the image with a greatest definition may be acquired and regarded as a focus image. The focus image's corresponding position is a focus position. After acquiring the focus position, an image may be projected thereon. The illustrated computing device is enabled to complete the image focusing automatically.

17 Claims, 5 Drawing Sheets

COMPUTING DEVICE WITH IMAGING FUNCTION AND AUTO-FOCUSING METHOD FOR PROJECTION THEREOF

BACKGROUND OF THE INVENTION

1. Field of the Invention

The instant disclosure relates to a computing device and an automatic controlling method thereto, more particularly to the computing device with imaging function and its auto-focusing method for projection.

2. Description of Related Art

Projector is one of the image output facilities often seen in the office or any meeting room. Some of the large projectors may conduct active focus adjustment according to the result made by an inside sensing element, therefore an auto-focusing is performed. The mentioned sensing element may be implemented to be an infrared sensor, a sonar sensor, or the like. The projector may use the sensing element to acquire the distance between the projector and the projecting screen. After that, the position where the projection lens of the projector projects on may be positioned. It is noted that the size of the projector may be too big to be a part of portable computing device since the volume occupied by the sensing element may not be reduced. The portable computing device may be a notebook computer or a personal digital assistant.

There is the small-scale projecting device existed on the market for projecting image as connecting to a computing device. However, in order to minimize the size, no sensing element is disposed to measure the distance and without the capability of auto-focusing. Therefore, a user would have to manually adjust the focusing distance of the projection lens based on the user's experience.

SUMMARY OF THE INVENTION

A computing device with imaging function is particularly disclosed in accordance with the instant disclosure. The computing device includes a projection unit, an image receiving unit and a processing unit. The projection unit has a projection lens and a driving unit. The processing unit further has a definition computing unit and a control unit. The projection lens is used to project the image output by the computing device. The driving unit is mechanically connected to the projection lens, and used to drive the projection lens moving at several projective positions along an optical axis. The image receiving unit receives the at least part of the images projected on the every projective position from the projection lens, and regards the received images as the candidate images. The each candidate image corresponds to the each projective position.

Furthermore, the processing unit controls the projection unit to project image and the image receiving unit to receive the candidate image. The definition computing unit is to execute a program instruction to retrieve the candidate images received by the image receiving unit. The definition computing unit also computes the definitions of the candidate images for acquiring the one image with a greatest definition. And this candidate image is regarded as a focus image. The projective position that the focus image projected on is a focus position. Based on this focus position, the control unit generates a control signal which is sent to the driving unit. The driving unit, according to the control signal, drives the projection lens moving to the focus position.

In one further embodiment, an auto-focusing method for the computing device with imaging function to project images is disclosed. The computing device includes a projection unit, an image receiving unit, and a processing unit. In the embodiment, the projection unit projects images corresponding to a plurality of projective positions along an optical axis. The image receiving unit is controlled to receive the every image orderly projected at each projective position through the projection lens, and those images are regarded as the candidate images. The candidate images one-by-one correspond to the mentioned projective positions. The embodiment further retrieves the candidate images received by the image receiving unit, and computes the definitions of the candidate images for acquiring the one image with a greatest definition. This candidate image with the greatest definition is regarded as a focus image, and further to acquire the projective positions with respect to the focus images. In particular, the position related to the focus image is the focus position. After the focus position is defined, the projection unit is controlled to locate the projection lens at the focus position and project the image.

In sum, the disclosed computing device with imaging function and its related auto-focusing method for projection allow the computing device with the image receiving unit to project image using the projection unit. Further, this computing device allows the projection unit to perform focusing automatically. Therefore, the projection unit is able to project the distinct and clear images.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
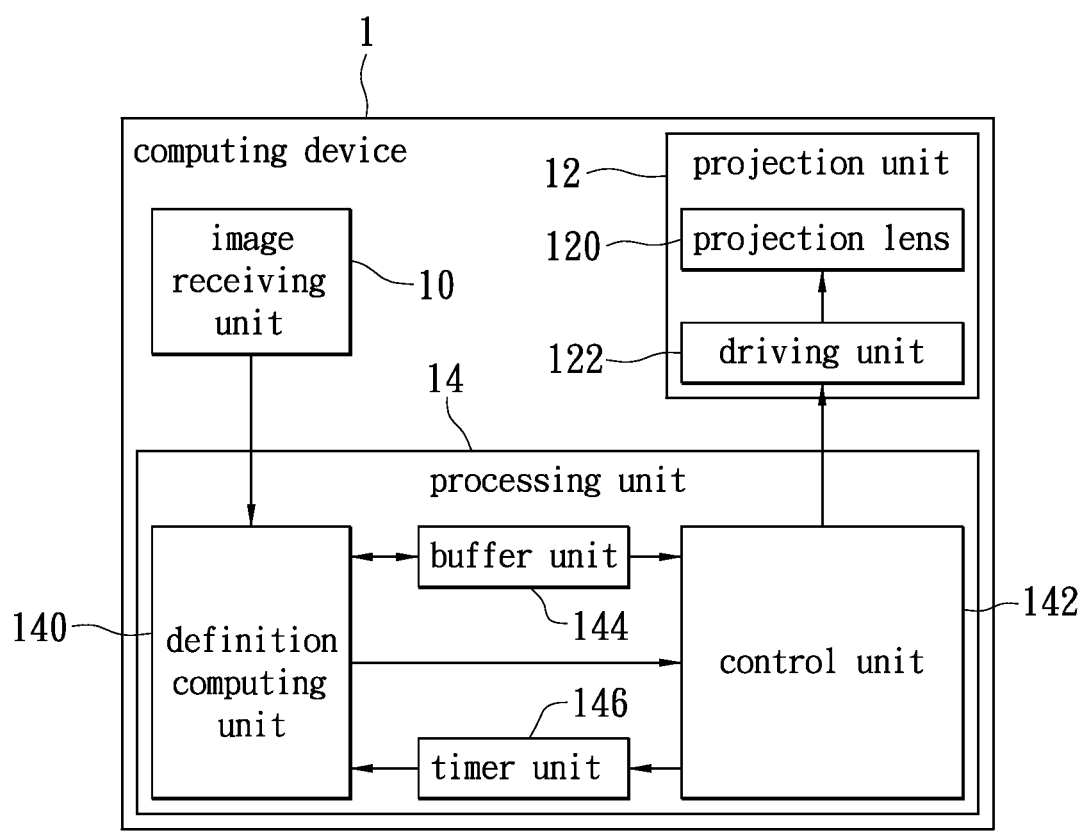
FIG. 1 shows a block diagram depicting an embodiment of the computing device with an imaging function.

Exemplary embodiment of the computing device:

Reference is made to FIG. 1 depicting a block diagram of the computing device of an embodiment. The computing device 1 exemplarily includes an image receiving unit 10, a projection unit 12, and a processing unit 14. The projection unit 12 further has a projection lens 120 and a driving unit 122. The processing unit 14 has a definition computing unit 140, a control unit 142, and a buffer unit 144. The image receiving unit 10 and the projection unit 12 are respectively coupled to the processing unit 14. The definition computing unit 140 is coupled to the image receiving unit 10, the control unit 142, and the buffer unit 144. The control unit 142 is coupled to the driving unit 122 of the projection unit 12. The projection lens 120 of the projection unit 12 is mechanically coupled to the driving unit 122.

The disclosed computing device 1 may be implemented as a portable device such as a notebook, a mobile phone, or a personal digital assistant (PDA) and the like. The computing device 1 may control the projection unit 12 to project the image onto a surface through the processing unit 14 such as a central processing unit (CPU) or an embedded controller, in order to output the information processed by the processing unit 14. The mentioned surface may be the object for displaying the image such as a whiteboard, a screen, or a wall, and the mentioned projection unit 12 may be a built-in projector or a removable mini projector. In which, the projection lens 120 of the projection unit 12 may be driven by the driving unit 122, and the projection lens 120 may move linearly among some different projective positions along an optical axis. Further, the definition of the projected image on the screen may be affected easily because of the variance of the related projective position through the projection lens 120. In other words, the more the projection lens 120 approaches the focus, the clearer the projected image is. Otherwise, the more the projection lens 120 leaves from the focus, the image is obscurer.

To allow the image projected on a surface to be adjusted to a finest state automatically, the mentioned processing unit 14 controls the projection lens 120 of projection unit 12 orderly projecting images at a plurality of projective positions along the optical axis. The processing unit 14 controls the image receiving unit 10 to retrieve the images projected on the surface by the projection unit 12. Further, the processing unit 14 may acquire the most suitable projective position from the retrieved images, therefore the projection lens 120 may be driven to the most suitable projective position and obtain the finest image with clearest view.

Still further, the definition computing unit 140 of the processing unit 14 then analyzes the definitions of the images retrieved by the image receiving unit 10 for acquiring the one image with a greatest definition. The value of definition of each image made by the definition computing unit 140 and its corresponding projective position may be buffered into the buffer unit 144. According to the projective position related to the image with greatest definition, the control unit 142 controls the driving unit 122 to drive the projection lens 120 moving to the described projective position. Therefore, a finest image may be obtained through the projection lens 120.

The image receiving unit 10 is exemplarily disposed on the surface of the computing device 1. The image receiving unit 10 is used to retrieve the external images. The image receiving unit 10 receives at least a part of the images projected onto the surface under control of the processing unit 14 when the projection lens 120 of the projection unit 12 projects many image on the surface. Those projected images particularly have their own different definitions. After that, the many candidate images with different definitions are generated. The received candidate images are then converted into image signals. Those image signals are transmitted to the processing unit 14. The image signals include the pixel information sensed by a sensing element of the image receiving unit 10. The image receiving unit 10 may be implemented as a compact camera module (CCM), a charge coupled device (CCD), or a CMOS camera.

The described projection unit 12 may be disposed on the surface of the computing device 1 and configured to project images according to the instructions of the processing unit 14. In which, the mentioned driving unit 122 for driving the projection lens 120 moving may be implemented as a micro-actuator or a step motor, and therefore used to convert signals into mechanical instructions in compliance with the processing unit 14. In one embodiment, the mentioned step motor gradually drives the projection lens 120 moving at some projective positions, and the projection lens 120 may move among the positions forward and backward. Therefore, the device may project the images with different definitions.

In addition to controlling the projection unit 12 to project the images and controlling the image receiving unit 10 to receive the candidate images, the processing unit 14 is also able to execute a set of program instructions for computing the definitions for the different candidate images. After that, the one image with greatest definition is obtained to be the focus image. Next, the projection unit 12 is then configured to move the projection lens 120 to the position with respect to the focus image for performing projection. Therefore, the finest image may be projected.

The definition computing unit 140 may then one-by-one retrieve the signals of candidate images orderly received by the image receiving unit 10. The candidate images may then be buffered in the buffer unit 144, and used for further computation and analysis. The projection lens 120 is particularly controlled by the processing unit 14 orderly moving forward or backward at the many projective positions. When the projection lens 120 approaches to the position of the focus, the every projected image is much clearer than the previous image. Otherwise, the projected image may be obscurer than the previous one as the projection lens 120 moves away from the focus.

The definition computing unit 140 particularly performs a contrast-focusing algorithm to obtain the focus image at the projective focus according to the program instructions. The definition computing unit 140 also selects some images from the buffered candidate images, and individually computes and compares the definition of each selected candidate image to determine the trend of change for those image definitions accordingly. The candidate image with greatest definition and its projective position may therefore be acquired. It is noted that the candidate image with the greatest definition is the focus image, whose corresponding projective position is a focus position where the focus is located.

Further, in the described contrast-focusing algorithm made by the definition computing unit 140, two candidate images retrieved in succession may be selected from the buffer unit 144. Then the pixels of the two images are computed for acquiring the respective definitions. These mentioned definitions are exemplarily the contrast of the two candidate images. Contrast is the differences of the pixels of an image. The definition computing unit 140 further compares the definitions of the two candidate images. The definition computing unit 140 may select a next candidate image from the group of images which probably have higher value of definition for further computation and comparison. In other words, the definition computing unit 140 selects a next candidate image from the direction toward the one candidate image having higher definition. If the definition of next selected candidate image is also higher than the previously selected candidate image, it describes that the projective position of the candidate image selected by the definition computing unit 140 gradually approaches the focus. Otherwise, if the definition of the selected candidate image is lower than the previously selected one, it shows the projective position of the latest selected candidate image already passes the position of the focus.

When the projective position of the projection lens 120 is away from the focus, the projected image would likely to be vague. The values of pixels of the vague candidate images would be much closer, and differences between the values of pixels are smaller. On the contrary, the projected image would be clearer as the projection lens 120 approaches the focus. To the clearer candidate images, colors and brightness of the image would be more precisely expressed via each pixel. The differences among values of the pixels of clearer images are also larger. Therefore, when the result of the comparison between two candidate images shows one of which has greater definition over the other, it is likely to predict that the projective position of the focus image tends to be close to the one with greater definition.

Figure 2:
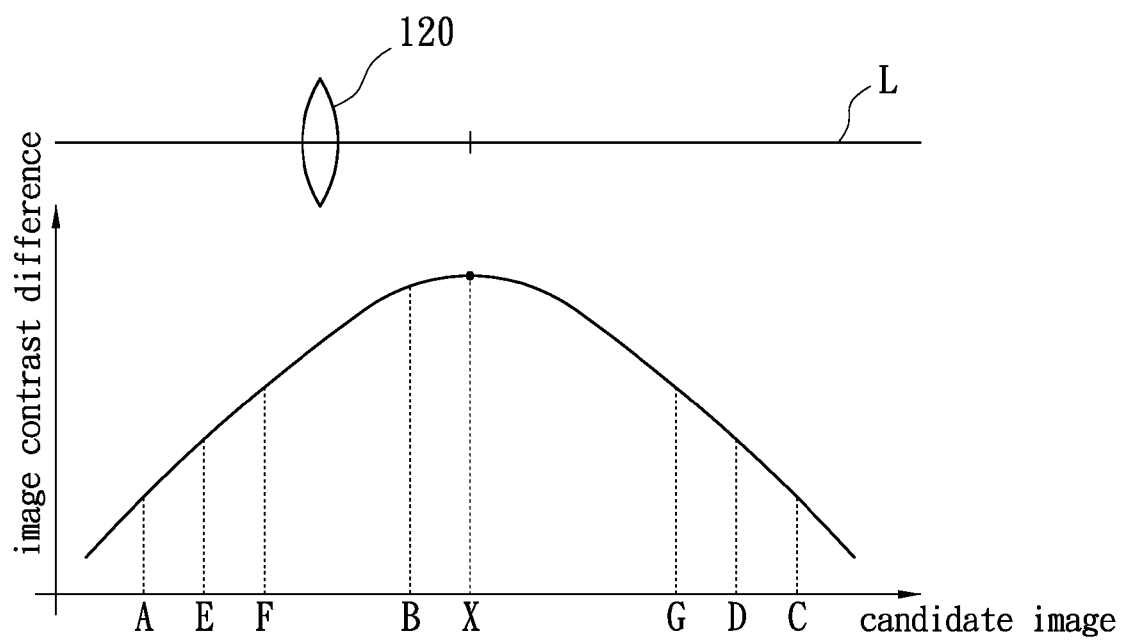
FIG. 2 schematically shows contrast difference and projective position of the candidate image in accordance with the present invention.

Reference is made to FIG. 2 depicting a schematic diagram of the coordinates with the contrast differences of the projective position relative to the candidate images. The horizontal axis thereof represents the candidate images retrieved by the definition computing unit 140 according to the sequence made by the image receiving unit 10. The vertical axis shows the values of the contrast differences of the candidate images. Furthermore, there is an optical axis L parallel with the horizontal axis used for the projection lens 120 moving along the multiple projective positions. Every described projective position corresponds to each of the candidate images disposed along the horizontal axis. The definition computing unit 140 may select two images from the many candidate images for further computation and comparison. In the present example, the selected images may exemplary be the candidate images A and candidate images B as shown in FIG. 2, wherein the contrast difference of the candidate image B is larger than the contrast difference of the candidate image A. The definition computing unit 140 determines that the candidate image A has smaller contrast difference and regards it as a first image. Oppositely, the candidate image B, which has larger contrast difference, is regarded as a second image. A range over the projective position between the first image and the second image is defined as a first sector.

As the definition computing unit 140 computes and performs a comparison between the images, a position of another candidate image to be selected may be determined. This position is preferably located away against the candidate image A, but close to the candidate image B. In an exemplary embodiment, a third image is selected by the definition computing unit 140, such as the candidate image C shown in FIG. 2. This third image is compared with the mentioned second image having the better definition by the previous comparison. In which, the projective position of the candidate image B lies in between the candidate image A and the candidate image C. The projective position ranged between the second image and the third image is defined as a second sector. After comparison performed by the definition computing unit 140, it is determined that the projective position of the candidate image C surpasses the position of the focus as the contrast difference of the candidate image C is smaller than the candidate image B. Since the position of the focus may be located between the candidate images B and C, the definition computing unit 140 selects a new third image there-between for reducing the range of the second sector. In the example of FIG. 2, the candidate image D located between the candidate images B and C is selected as the new third image. Further, the definition of the second image is then compared with the latest selected third image.

When the comparison shows the definition of the second image is better than the new third image, the comparison is then performed on the first image and the second image. Meanwhile, the definition computing unit 140 further selects one new first image between the candidate images A and B, and the definition of this new image is used to compare with the previous second image (i.e. the candidate image B in this example). This new first image is such as the candidate image E shown in FIG. 2. Next, the process further computes and compares the definitions of the candidate images E and candidate image B. If the definition of the candidate image E is still smaller than the candidate image B, another new first image is further selected within the first sector, and this new image is such as the candidate image F shown in FIG. 2. To repeat the described steps, the comparison results in narrowing the range of the first sector for further comparison. If the definition of the second image is still better than the new selected first image, the comparison is performed on the images within the second sector. Therefore, the above described scheme is provided to gradually approach the candidate image with the greatest definition whose projective position with respect to the focus.

Next, the definition computing unit 140 selects a new third image within the narrowed second sector, and this new image is such as the candidate image G of FIG. 2. The comparison of the contrast difference is performed on the new third image to the second image. In the present example, if the contrast difference of the new selected third image is larger than the second image, the definition computing unit 140 may then determine that the focus image is situated within the second sector between the candidate image B and the candidate image G. The definition computing unit 140 then configure the candidate images B and G to be the first image and the third image respectively after confirming the range where the projective position of the focus image falling in. One more candidate image regarded as another second image is selected between the candidate images B and G, and again this candidate image is used to narrow the range where the focus position is located on. As iterating the steps, the last candidate image X may be acquired, and its corresponding definition in the second sector may be larger than the definitions of other candidate images. In the meantime, the projective position with respect to the candidate image X is determined by the definition computing unit 140, and the image's projective position is regarded as the focus position.

In sum, the described definition computing unit 140 in accordance with the present embodiment may be configured to retrieve the multiple candidate images to acquire one candidate image having the largest contrast difference by means of a three-point comparison. This three-point comparison scheme is particularly used to compare the definitions of the first, second and third images in each comparison for approaching the one candidate image with the finest image. This candidate image with the largest contrast difference is the focus image for acquiring the focus with respect to the finest image's projective position.

Since the projection unit 12 is controlled by the processing unit 14 and configured to project images at various projective positions, the definition computing unit 140 may therefore buffer the retrieved candidate images and their corresponding projective positions into the buffer unit 144. Therefore, once the definition computing unit 140 determines the focus image, the corresponding projection position of the focus image is also instantly determined.

Still further, the control unit 142 coupled to the definition computing unit 140 receives any information from the definition computing unit 140. A control signal is then generated by the control unit 142 according to the projective position of the focus image notified by the definition computing unit 140. The control signal is transmitted to the driving unit 122 of the projection unit 12. This driving unit 122 may be an actuator or a motor capable of converting electric signals into mechanical instructions. This actuator is such as a micro actuator. The motor is exemplarily a step motor. According to the projective position responsive to the control signal, the driving unit 122 drives the projection lens 120 to the projective position with respect to the focus image. This position of the focus image is deemed the focus position processed by the processing unit 12. Therefore, the finest image is able to be projected through the projection lens 120 located on the focus.

The program for performing retrieval of the images and the comparison may be suspended when the definition computing unit 140 obtains the projective position of the focus image by suitable computation and comparison operation. However, when the computing device 1 or its related projective screen moves, the previously obtained focus position may fail. The projective position of the projection lens 120 should be adjusted by repeating the above process for acquiring the proper projection to prevent from the above-mentioned failure.

In the present example, the processing unit 14 also includes a timer unit 146 coupled between the definition computing unit 140 and the control unit 142. As the control unit 142 generates the control signal, a trigger signal may be also provided to the timer unit 146. The timer unit 146 accordingly starts to count with a preset time, for example 10 seconds. When the counting time reaches the preset time, a start signal is generated to the definition computing unit 140 for performing further retrieval and comparison of the candidate images.

When the definition computing unit 140 receives the start signal from the timer unit 146, the processing unit 14 controls the projection unit 12 to move the projection lens 120 at multiple projective positions. The definition computing unit 140 executes the related program instruction for retrieving the candidate images again. Also, the processes of the described selection, computation, and comparison performed on the candidate images are iterated. Therefore, the projective position with respect to the candidate image with the greatest definition would be regularly and correctly obtained.

Figure 3:
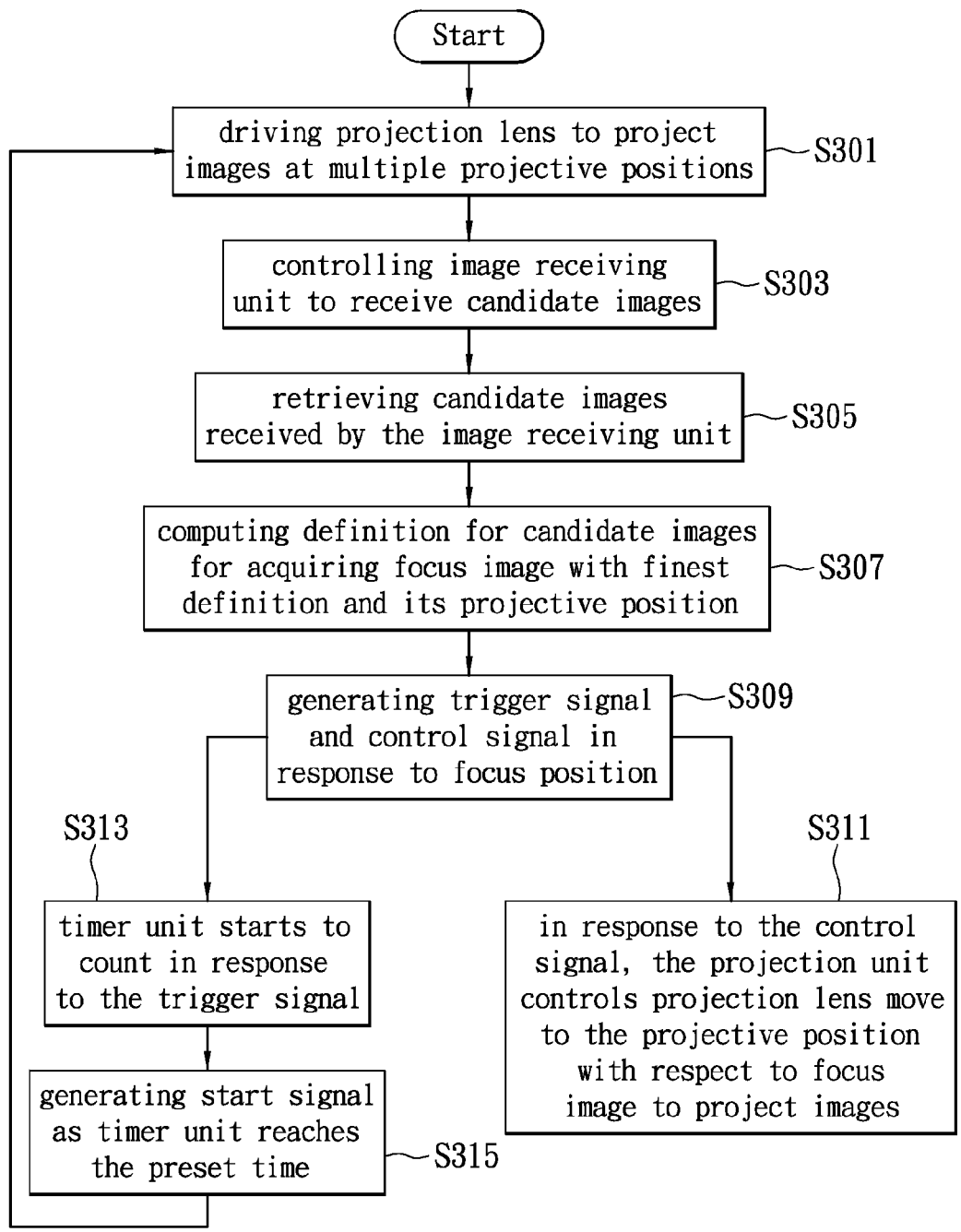
FIG. 3 illustrates a flow chart of the auto-focusing method for projection for the computing device in accordance with the present invention.

Exemplary embodiment of an auto-focusing method for projection:

Reference is made to FIG. 3, which depicts a flow chart relating to the auto-focusing method for projection in an embodiment. This method is particularly performed upon the computing device with imaging function shown in FIG. 1, which the following description is related.

The operating flow in the embodiment is essentially performed by the processing unit 14 of the computing device 1. The method may control the projection unit 12 with the processing unit 14. The projection unit 12 drives the projection lens 120 linearly moving at different projective positions along an optical axis, and projects images on a surface (step S301). The processing unit 14 also controls the image receiving unit 10 to receive at least part of every image on the surface projected by the projection unit 12 and individually generate the candidate images (step S303).

The definition computing unit 140 of the processing unit 14 is able to execute the program instruction for retrieving the candidate images orderly received by the image receiving unit 10 (step S305). The retrieved candidate images are buffered in the buffer unit 144 for further computation and analysis. The definition computing unit 140 executes the program instruction to make a selection and to compute the definitions of the candidate images. Exemplarily, the contrast difference of each candidate image is referred to determine the definitions of the candidate images. Based on each definition determined, one candidate image with the greatest definition is regarded as the focus image and its corresponding projective position is identified (step S307). In particular, the projective position with respect to the focus image is the position of the focus along the optical axis.

Further, the control unit 142 of the processing unit 14 generates a trigger signal as receiving the information relating to the focus position computed by the definition computing unit 140. The control unit 142 also generates a control signal in response to the focus position (step S309). The control signal is then transmitted to the driving unit 122 of the projection unit 12. This driving unit 122 is mechanically connected to the projection lens 120. In response to the control signal, the driving unit 122 drives the projection lens 120 moving to the focus position (step S311). Therefore, the projection lens 120 stops projecting images around the focus position and outputs images at the focus. The finest and recognizable images may appear on the surface. Furthermore, a trigger signal is generated from the control unit 142 and transmitted to the timer unit 146 to initiate the time counting. As the definition computing unit 140 obtains the most suitable projective position, the timer unit 146 starts the countdown for a preset time (step S313). When the preset time has lapsed, the timer unit 146 generates a start signal to the processing unit 14 (step S315). The processing unit 14 performs the step S301 and the following steps in response to the start signal. The projective position would be modified dynamically since the previously computed focus position may not be the most suitable position anymore as the computing device 1 or the projective screen may move occasionally. The processing unit 14 repeats the above-illustrated steps in response to the start signal may prevent the computing device 1 from projecting unclear images.

In step S307, the program instruction is executed by the definition computing unit 140. The value of definition of the one or more candidate images is computed, and one image with the greatest definition is acquired. In one preferred embodiment, a comparison scheme for the contrast differences of pixels for each candidate image is particularly incorporated. Especially the mentioned three-point comparison is performed to determine the focus image with the greatest definition.

Figure 4:
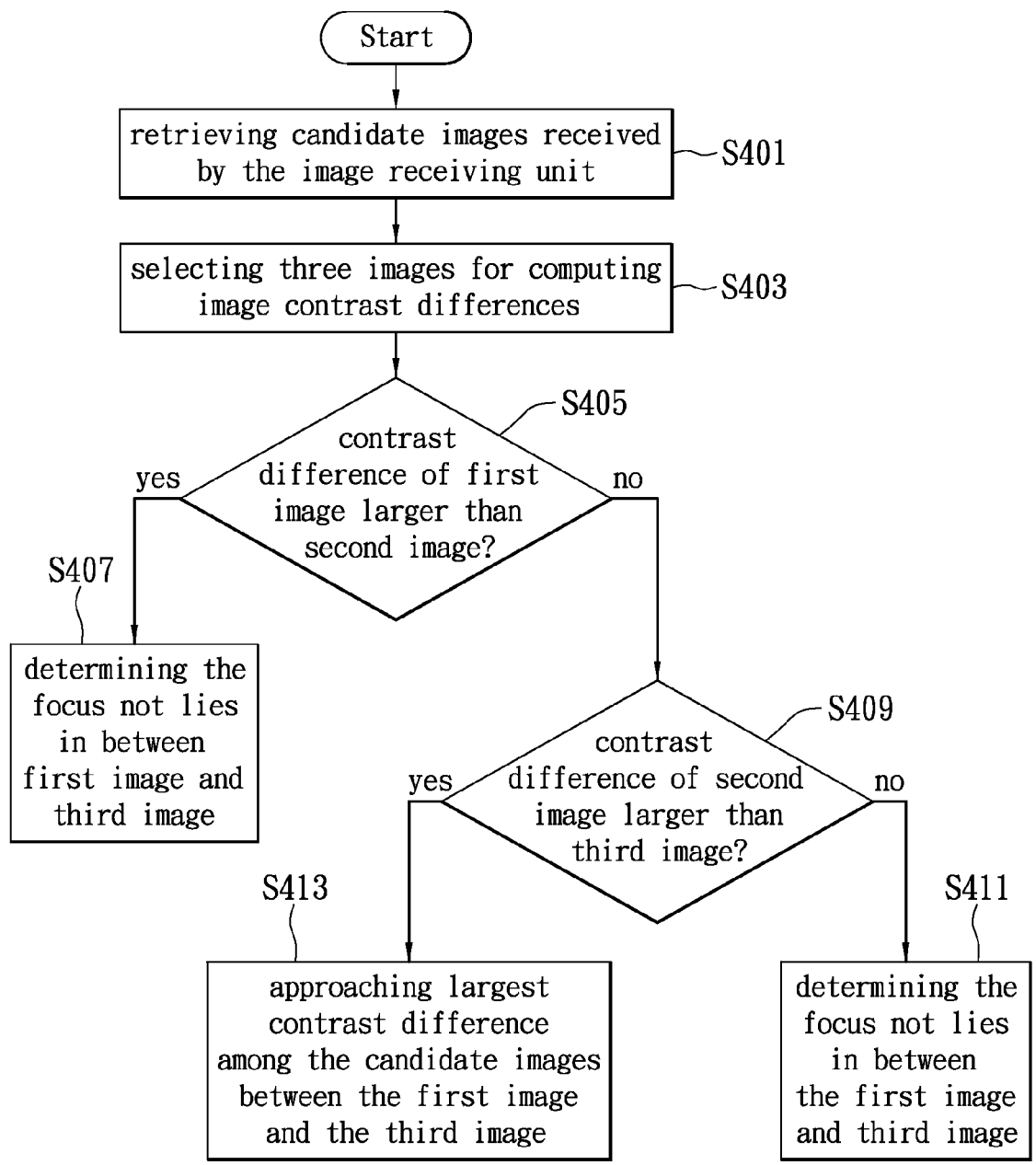
FIG. 4 illustrates a flow chart of determining the focus position by the disclosed processing unit in accordance with the present invention.

FIG. 4 further shows a flow chart illustrating the method for determining the greatest contrast difference by the definition computing unit 140.

The described definition computing unit 140 is used to retrieve the candidate images received by the image receiving unit 10 in response to the program instruction (step S401). The candidate images are buffered into the buffer unit 144. A first image M, a second image N, and a third image O are sequentially selected from the candidate images which are buffered in the buffer unit 144. The second image N is retrieved in order between the first image M and the third image O are retrieved (step S403).

Figure 5A:
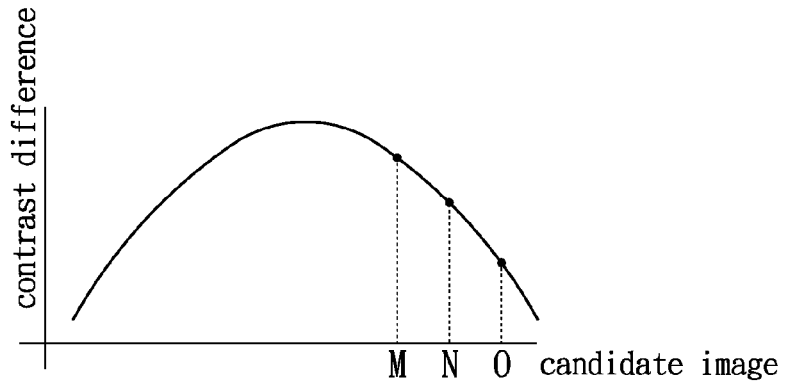
FIGS. 5A to 5C show the schematic diagrams of the contrast differences and projective positions of the candidate images in accordance with the present invention.

Next, the contrast differences for the pixels of the first, second and third images are computed. In step S405, whether the pixel contrast difference of the first image M is larger than the contrast difference of the second image N is determined by a comparing means (step S405). In an exemplary example, if the step confirms that the pixel contrast difference of the first image M is larger than the second image N, a focus position with respect to the focus does not lie in between the first image M and the third image O (step S407). Reference is made to FIG. 5A.

On the contrary, if the pixel contrast difference of the first image M is not larger than the contrast difference of the second image N, the step further goes to determine whether the pixel contrast difference of the second image is larger than the contrast difference of the third image (step S409).

Figure 5B:
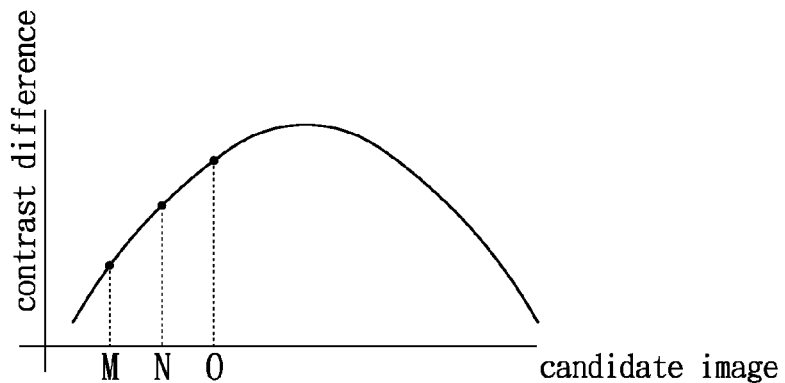

In an exemplary example, if the pixel contrast difference of the second image is not larger than the third image, it also show that the projective position with respect to the focus does not lie in between the first image and the third image (step S411), such as the curve shown in FIG. 5B.

Figure 5C:
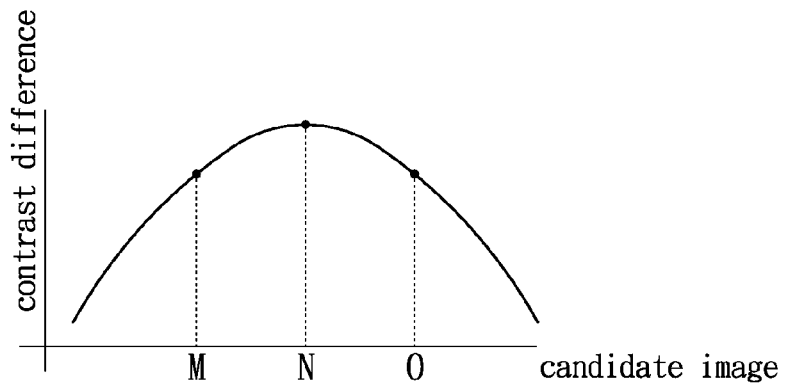

However, if the pixel contrast difference of the second image is not only larger than that of the first image, but also larger than the contrast difference of the third image, it shows that the projective position of the focus lies in between the projective positions of the first image and the third image (step S413), such as the curve shown in FIG. 5C.

In consequence, the above-described scheme is incorporated to selecting the new first image and the third image for comparing with the second image individually. The definition computing unit 140 may therefore gradually approach candidate image responsive to the projective position of the focus, such as the step S413. The process of comparison and selection are continuously performed until not only are the first image and the third image respectively the former and latter candidate images of the second image, but also the pixel contrast difference of the second image is larger than both contrast differences of the first image and the third image. In the meantime, it is determined that the second image has the greatest contrast difference, and has greatest definition, and the second image's corresponding projective position is where the focus locates.

It is noted that the embodiment is exemplarily described, but not limited to, in the first embodiment in view of the FIG. 2.

It is also worth noting that the algorithm adopted by the mentioned definition computing unit to obtain the greatest definition may also compute the every contrast difference of every retrieved candidate image, and to acquire the maximum contrast difference. Therefore, the candidate image with the greatest definition and its corresponding projective position may be determined. The flow depicted in FIG. 4 is one of the schemes.

The effect of the embodiments may include:

The projection unit may be an output device for the computing device, and directly project images onto the projective screen. The projection unit provides the computing device additional output device except for a display panel (e.g. LCD).

More, in accordance with the present invention, the computing device may utilize the image receiving unit and the processing unit which are originally manufactured as part of the computing device to serve the auto-focusing function for the projection unit. The effect may keep the images projected from the projection unit in condition of a finest and clearest state. The processing unit retrieves the images received by the image receiving unit, and computation and comparison are performed on the images for acquiring the focus image which has the greatest definition. Furthermore, based on the projective position with respect to the focus image, the position where the projection lens of the projection unit focuses is automatically determined rather than the manual adjustment for the position of the projection lens by visually checking the definition.

Still further, in accordance with the present embodiments, the image receiving unit of the computing device is not required to have ability of focusing, but merely to perform the retrieval of images. The related tasks such as computation and analysis may be integrated into the processing unit, for example the CPU of a notebook or the embedded controller of a mobile device. The invention allows the device to function the focusing but the manufacturer needs not to provide any additional components except for the built-in or external projector of the present computing device. Therefore, the invention may reduce the cost and expedite the yielding.

Still further, in accordance with the present disclosure, the three-point comparison may be performed by the processing unit, and used to retrieve the three images for further computation, comparison and used to effectively converge the range for comparison. It also features that the processing unit may reduce its computation load and computing hour since the processing unit needs not the process all image in the sequence. Therefore, the invention is able to enhance the focusing efficiency and effectively minimize the time for focusing.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A computing device with an imaging function, comprising:
   a projection unit, comprising:
      a projection lens, projecting an image output from the computing device; and
      a driving unit, mechanically connected to the projection lens for driving the projection lens moving among a plurality of projective positions along an optical axis;
   an image receiving unit, receiving the images orderly projected at every projective position through the projection lens, and at least a part of each image regarded as a plurality of candidate images that one-by-one correspond to the projective positions; and
   a processing unit, controlling the projection unit to project the images and the image receiving unit to receive the candidate images, the processing unit comprising:
      a definition computing unit, executing a program instruction to retrieve the candidate images received by the image receiving unit, and computing contrast of the candidate images to determine definition of each of the candidate images for acquiring one candidate image whose definition is better than the definition of other candidate images, and deemed a focus image, wherein the projective position with respect to the focus image is a focus position; and
      a control unit, generating a control signal according to the focus position;
   wherein, when the driving unit receives the control signal, the projection lens is driven to the focus position according to the control signal;
   wherein the definition computing unit selects a first image, a second image and a third image from the retrieved candidate images, and computes the definition of each selected image, wherein the projective position related to the second image is between the projective position of the first image and the projective position of the third image, and confirms whether the position of the focus image is between the projective position of the first image and the projective position of the third image according to the computation of the definition.

2. The device of claim 1, wherein the definition computing unit determines whether the definition of the second image is greater than the definition of the first image and the definition of the third image; and determines that the position of the focus image is between the projective position of the first image and the projective position of the third image when the definition of the second image is greater than the definition of the first image and also greater than the definition of the third image.

3. The device of claim 1, wherein the processing unit further comprises:
   a buffer unit, for buffering the candidate images and the projective positions with respect to the candidate images, and buffering the values of definitions computed by the definition computing unit.

4. The device of claim 1, wherein the processing unit further comprises:
a timer unit, receiving a trigger signal for initiating time counting, and transmits a start signal to the definition computing unit as reaching a preset time;
wherein, the control unit generates the trigger signal according to the focus position computed by the definition computing unit, and the definition computing unit receives the start signal and retrieves the candidate images received by the image receiving unit.

5. The device of claim 1, wherein the driving unit is an actuator.

6. The device of claim 1, wherein the driving unit is a step motor.

7. The device of claim 1, wherein the processing unit is a central processing unit or an embedded controller.

8. An auto-focusing method for projection of a computing device with an imaging function, the computing device comprises a projection unit, an image receiving unit, and a processing unit, the method comprising:
controlling the projection unit to project images at a plurality of projective positions along an optical axis;
controlling the image receiving unit to receive the images orderly projected at every projective position through the projection unit, and deeming a plurality of candidate images, wherein the candidate images correspond to the projective positions;
retrieving the candidate images received by the image receiving unit;
computing contrast of the candidate images to determine definition of each of the candidate images for acquiring one candidate image whose definition is better than the definition of other candidate images, and deeming a focus image and acquiring the corresponding projective position of the focus image, wherein the projective position with respect to the focus image is a focus position; and
controlling the projection unit to project the images at the focus position,
wherein the step of acquiring the focus image comprises:
(a) selecting a first image, a second image, and a third image from the candidate images, wherein the projective position of the second image is between the projective position of the first image and the projective position of the third image;
(b) computing the contrast of the first image, the second image, and the third image;
(c) determining whether the contrast of the second image is greater than the contrast of the first image and the contrast of the third image;
(d) determining that the focus position with respect to the focus image is between the projective position of the first image and the projective position of the third image when the contrast of the second image is larger than the contrast of the first image and larger than the contrast of the third image.

9. The method of claim 8, wherein the step of controlling the projection unit to project the images at the focus position comprises:
generating a control signal based on the focus position; and
transmitting the control signal to a driving unit of the projection unit for driving a projection lens of the projection unit moving to the focus position.

10. The method of claim 8, wherein the step of computing the contrast of the candidate images for acquiring the focus position comprises:
generating a trigger signal based on the focus position;
transmitting the trigger signal for controlling a timer unit to initiate time counting according to a preset time;
generating a start signal when the time counting reaches the preset time; and
according to the start signal, the method going back to perform the step of controlling the projection unit to project images at the projective positions along the optical axis.

11. The method of claim 8, wherein a first sector is included between the first image and the second image, and a second sector is included between the second image and the third image, the method further comprises after step (d):
selecting the first image, the second image, and the third image among the candidate images within the first sector;
performing steps (b) to (d) until the projective positions of the first image, the second image and the third image are adjacent, for confirming the focus image is the second image within the first sector; and
when the definition of the second image selected in the first sector is not greater than the definition of the first image or the definition of the third image, selecting the first image, the second image, and the third image from the candidate images within the second sector, and performing the steps (b) to (d) until the projective positions of the first image, the second image, and the third image are adjacent, and confirming the second image in the second sector is the focus image.

12. A computing device with an imaging function, comprising:
a projection unit, comprising:
a projection lens, for projecting images output from the computing device; and
a driving unit, mechanically connected to the projection lens, for driving the projection lens moving among a plurality of projective positions along an optical axis;
an image receiving unit, receiving the images orderly projected at every projective position through the projection lens, and at least a part of each image regarded as a plurality of candidate images that one-by-one correspond to the projective positions; and
a processing unit, controlling the projection unit to project the images, and controlling the image receiving unit to receive the candidate images, wherein the processing unit comprises:
a definition computing unit, retrieving the candidate images received by the image receiving unit, and computing contrast of the candidate images to determine definition of each of the candidate images for acquiring one candidate image whose definition is better than the definition of other candidate images, and determining the candidate image whose definition is better than the definition of other candidate images to be a focus image, wherein the projective position with respect to the focus image is a focus position; and
a control unit, generating a control signal based on the focus position;
wherein, the definition computing unit selects a first image, a second image, and a third image from the candidate images, and computes the definitions of the selected images, wherein the projective position of the second image is between the projective position of the first image and the projective position of the third position, and determines that the focus position of the focus image is between the projective positions of the first image and the third image when the definition of the second image is greater than the definition of the first image and greater than the definition of the third image;

wherein, the driving unit receives the control signal, and accordingly drives the projection lens moving to the focus position.

13. The device of claim 12, wherein the processing unit further comprises:

a buffer unit, for buffering the candidate images and their corresponding projective positions, and buffering the values of definitions computed by the definition computing unit.

14. The device of claim 12, wherein the processing unit further comprises:

a timer unit, receiving a trigger signal for initiating time counting, and transmitting a start signal to the definition computing unit as the time counting reaching a preset time;

wherein, the control unit further generates the trigger signal in response to the focus position computed by the definition computing unit, and the definition computing unit receives the start signal for retrieving the candidate images received by the image receiving unit.

15. The device of claim 12, wherein the driving unit is an actuator.

16. The device of claim 12, wherein the driving unit is a step motor.

17. The device of claim 12, wherein the processing unit is a central processing unit or an embedded controller.

* * * * *